250
UNITED STATES PATENT OFFICE.

SAMUEL CLELAND DAVIDSON, OF BELFAST, IRELAND.

TREATMENT OF LATEX.

1,146,851.  Specification of Letters Patent.  Patented July 20, 1915.

No Drawing.  Application filed May 16, 1914.  Serial No. 839,088.

*To all whom it may concern:*

Be it known that I, SAMUEL CLELAND DAVIDSON, subject of the King of Great Britain, residing at Sirocco Engineering Works, Belfast, Ireland, have invented new and useful Improvements Relating to the Treatment of Latex, of which the following is a specification.

This invention relates to the treatment of latex and more particularly latex of the kind known as Pará of *Hevea Brasiliensis*, and is applicable to the fluid latex whether or not the latex has been subjected to previous treatment, such for example as when ammonia or other alkaline substance or formaldehyde has been added to prevent a tendency which sometimes exists for the latex to coagulate spontaneously before it can be brought into the factory.

The object of the present invention is to cause the caoutchouc in the course of its coagulation from the latex to become homogeneously and intimately impregnated or incorporated with a preservative substance or substances.

In my previous specifications Serial Numbers 730,352 and 744,732 I proposed to incorporate with the latex a preservative substance (and in some cases a small amount of a soluble salt of sulfur which deposits sulfur on addition of an acid) in an alkalized or alkaline solution such that it is freely soluble in water and will mix uniformly through the latex without causing coagulation of the caoutchouc, but which the subsequent addition to the latex of any suitable acid or acid substance for coagulation of the caoutchouc will decompose and thereby liberate from the alkalized solution the preservative substance thereof, and also liberate sulfur from the soluble salt of sulfur when same has been employed, so that these substances will be deposited and retained in the coagulating caoutchouc and thus be homogeneously distributed throughout the mass thereof as described in my prior specifications Nos. 730,352 and 744,732. In my said prior specifications Serial Numbers 730,352 and 744,732 I proposed for this purpose to employ an aqueous alkaline solution of creosote or carbolic acid or mixtures thereof.

According to the present invention I employ an alkaline mixture of certain constituents of creosote, namely, the isomeric cresols, either individually or in the commercial mixture known as cresylic acid, or their higher homologues known commercially as "higher tar acids" and which prepared mixture for brevity of description is hereinafter referred to as "alkalized cresol" which I have found to give more satisfactory results than creosote and to be more easily and uniformly deposited in the coagulated caoutchouc. I may add such alkalized cresol to the latex at any time prior to the coagulation of the caoutchouc therefrom, or I may add it simultaneously with the acid or acid substance used for effecting the coagulation.

In making the alkaline preparations of the cresols, cresylic acid or higher tar acids in practice, I make use of the caustic alkalis, preferably mixing the cresols, cresylic or tar acids with a strong solution of the alkali in such proportions that the cresols, cresylic or tar acids are rendered readily soluble in water and remain in solution when diluted with water to any required extent. Rain or soft water should preferably be used for making said alkalized cresol solutions. When I incorporate soluble sulfur salts with the said alkalized cresol solutions I preferably employ sulfids or polysulfids such as those of soda or potash. In some cases I may also mix with the alkalized cresol or add to the latex in conjunction therewith a small proportion of formaldehyde in solution.

The following are some examples of practical applications of the invention, but it is to be understood that I do not confine myself to the details and proportions given, which may be varied within wide limits:

Example 1: I may mix with 108 parts of cresylic acid or 120 parts of higher tar acids a solution of 40 parts of caustic soda or 56 parts of caustic potash in 120 parts of water. This forms an aqueous solution to which any further quantity of water can be added without precipitation of the cresylic acid or higher tar acids.

Example 2: To each 100 parts of the mixture of alkalized cresol as described in Example 1, I may add 1 (or more) parts of liver of sulfur dissolved in about 15 parts of water to each 1 part of liver of sulfur, or an aqueous solution of any other polysulfid or sulfid of potash or soda having an equivalent amount of sulfur in it to that contained in the solution of liver of sulfur as above described and employed.

Example 3: To each 100 parts of the mixture of alkalized cresol, as described in Examples Nos. 1 or 2, I may add 5 or more parts by weight of 20% to 40% formaldehyde solution.

In practical use I may add and stir into the latex a suitable proportion—say from 1 to 5%—of any of the above referred to three examples of the undiluted alkalized cresol mixtures, or any of the herein referred to modified mixtures thereof, and I may add same either in the full strength of said mixtures, or as a dilute solution by adding a considerable quantity of water thereto. The proportions in which said alkalized cresol, or the hereinbefore referred to modified preparations thereof, are added to the latex may vary according to requirements and to the character of the latex, which as is known, varies considerably with the locality from which it comes, the season of tapping, and other conditions.

When I treat the latex with a dilute solution of the mixture, I previously add to said mixture sufficient water to increase its bulk to about 50 or 100% of the latex, but the amount of such dilution may be varied within wide limits. The water for dilution may be either hot or cold, and the diluted mixture may be either hot or cold when added to the latex.

When I have treated the latex with any of the preferred alkalized mixtures, whether in the full strength thereof, or when diluted with water, I usually allow the treated latex to stand over for a time say 24 hours, during which period, if the mixture has been used in its undiluted condition, the latex usually assumes a more or less thickened or creamy consistency, and then shortly before proceeding with the next or coagulating treatment with an acid or acid substance, I generally find it desirable to thin down the latex by adding and stirring into it sufficient water (preferably warm) to reduce its creamy consistency to about that of ordinary fresh or skimmed milk, even although the amount of water required may increase its bulk by 50 to 100% but when the mixture is applied in a considerably diluted form the latex on keeping over, has little, if any, tendency to thickening into said cream-like consistency, and consequently further dilution with water, prior to the coagulation may be omitted.

The latex after being preliminarily treated as described may be coagulated by any suitable acid, or acid substance, for example acetic, trichloracetic, sulfuric, or hydrochloric acid. I ordinarily use sulfuric acid in the form of a very dilute aqueous solution, of say about ½ or ¼% strength, and I preferably add same to the latex at a temperature of about 150 degrees F., but it may when preferred be added cold, or at the ordinary atmospheric temperature. When said coagulating treatment has been applied, the coagulated rubber, which then separates out from the mother liquor, may be worked up and prepared for the market in any suitable way.

The alkalized cresol or preservative solutions hereinbefore referred to may in some cases be added to the latex at the same time or substantially the same time as the acid or acid substance used for coagulation, in which case coagulation of the rubber from the latex takes place without further treatment.

By way of example any of the solutions or mixtures set out in the foregoing examples may be added to the latex simultaneously with some or all of the dilute acid solution used for coagulation the alkaline solution being previously diluted or not.

What I claim and desire to secure by Letters Patent is:—

1. In the extraction or coagulations of india rubber, adding an aqueous solution of alkalized cresol to the rubber latex.

2. In the extraction or coagulation of india rubber, adding an aqueous solution of alkalized resol and soluble sulfids or polysulfids to the rubber latex.

3. In the extraction or coagulation of india rubber, adding an aqueous solution of alkalized cresol and formaldehyde to the rubber latex.

4. In the extraction or coagulation of india rubber, adding an aqueous solution of alkalized cresol and formaldehyde and soluble sulfids or polysulfids to the rubber latex.

5. In the extraction or coagulation of india rubber, adding an aqueous solution of alkalized cresol to the rubber latex, and coagulating the rubber by adding an acid coagulating agent capable of liberating the preservative substance in the coagulating caoutchouc.

6. A process for the extraction or coagulation of india rubber from latex, comprising a preliminary treatment of the latex with a solution of alkalized cresol, and subsequently coagulating the rubber by addition of a dilute solution of an acid coagulating agent, capable of liberating the preservative substance in the coagulating caoutchouc, substantially as and for the purpose described.

In witness whereof, I have hereunto signed my name in the presence of two subscribing witnesses.

SAMUEL CLELAND DAVIDSON.

Witnesses:
 HUGH T. COULTER,
 JOHN JOHNSON.